(12) United States Patent  
Lunteren

(10) Patent No.: US 9,471,713 B2  
(45) Date of Patent: Oct. 18, 2016

(54) HANDLING COMPLEX REGEX PATTERNS STORAGE-EFFICIENTLY USING THE LOCAL RESULT PROCESSOR

(75) Inventor: Jan van Lunteren, Gattikon (CH)

(73) Assignee: International Business Machines Corporation, Armonk, NY (US)

(*) Notice: Subject to any disclaimer, the term of this patent is extended or adjusted under 35 U.S.C. 154(b) by 1627 days.

(21) Appl. No.: 12/369,440

(22) Filed: Feb. 11, 2009

(65) Prior Publication Data

US 2010/0205411 A1 Aug. 12, 2010

(51) Int. Cl.
*G06F 17/30* (2006.01)

(52) U.S. Cl.
CPC .................. *G06F 17/30985* (2013.01)

(58) Field of Classification Search
None
See application file for complete search history.

(56) References Cited

U.S. PATENT DOCUMENTS

2005/0238010 A1* 10/2005 Panigrahy et al. ........... 370/389

OTHER PUBLICATIONS

Van Lunteren, Jan, High-Performance Pattern-Matching for Intrusion Detection, IEEE, 2006.
Van Lunteren, Jan, High-Performance Pattern-Matching for Intrusion Detection, INFOCOM 2006, 25th IEEE International Conference on Computer Communications. Proceedings. Apr. 2006, pp. 1-13.

* cited by examiner

*Primary Examiner* — William B Partridge
(74) *Attorney, Agent, or Firm* — Scully, Scott, Murphy & Presser, P.C.; Daniel P. Morris, Esq.

(57) ABSTRACT

A result processor access a result table for an entry associated with a predetermined sub-expression of a regular expression in response to a finite state machine finding the predetermined sub-expression in the input stream. The result processor executes an instruction associated with the entry, the instruction including one or more operations to be performed on one or more bits in a bit vector register, and determines as a function of the one or more bits in the bit vector register whether the complex regular expression has been found in the input stream.

19 Claims, 2 Drawing Sheets

HANDLING COMPLEX REGEX PATTERNS STORAGE-EFFICIENTLY USING THE LOCAL RESULT PROCESSOR

FIELD OF THE INVENTION

The present disclosure relates generally to interpreting expressions used in computer processors and more particularly to handling complex regular expression patterns using local result processor.

BACKGROUND OF THE INVENTION

A common problem of using deterministic finite state machine (FSM) for regular-expression matching is that certain combinations of regular expressions can require very large numbers of states and state transitions, often called a "state explosion", when being mapped on the same FSM, resulting in very large storage requirements. This applies in particular to regular expressions that contain a lot of "overlaps." "Overlaps" are portions of patterns for which matching input strings in the input stream are likely to match multiple other patterns or portions of patterns too.

There are many types of "overlaps." One type is caused by the use of metacharacters such as "." followed by a quantifier. This metacharacter is used to match any character. Example of quantifier may include "*" or "+". Quantifiers are used to match multiple characters in place of the quantifier. Another type of "overlap" is caused by the use of character classes containing a large number of characters also followed by a quantifier.

Two sample descriptions of these two types of regular expressions are:

<regex subexpression 1a>.*<regex subexpression 1b> and

<regex subexpression 2a>[0-9a-zA-Z]+<regex subexpression 2b>

The regex subexpression can be any regular expression or string. Two examples of the above expressions are:

regex1=abcd.*efgh regex2=pqrs[^\n]*tuvw

The first expression regex1 specifies that the input should contain a string "abcd", followed by another string "efgh" and that there can be any number of characters in between. The second expression regex2 specifies that the input should contain a string "pqrs", followed by a second string "tuvw", and that there can be any number of characters in between except that none of theses characters is allowed to be a newline character, denoted by ^ (not) "\n" (newline).

If these regular expressions would be mapped directly on a single state diagram, then the state vector has to represent whether at any given moment during the match operation the first subexpressions of the regular expression, namely "abcd" and "pqrs" already have been found in the input stream or not. Because of the ".*" and "[^\n]*" there are several combinations possible regarding the order in which these subpatterns can be found, e.g., none of the first subpatterns have been found, only subpattern "abcd" has been found, only subpattern "pqrs" has been found, both subpatterns have been found. All of these combinations have to be encoded into the state vector since the expressions are scanned in parallel and processed at the same time. It will be clear that in case of many such regular expressions, the number of different combinations that have to be encoded in the state vector can increase very rapidly, resulting in a possible "state explosion" and corresponding increase in storage requirements.

BRIEF SUMMARY OF THE INVENTION

A method and system for handling complex regular expression patterns using local result processor are provided. The method in one aspect may include scanning by a finite state machine, an input stream, and accessing by a result processor, a result table for an entry associated with a predetermined sub-expression of a regular expression in response to the finite state machine finding the predetermined sub-expression in the input stream. The method may also include executing by the result processor an instruction associated with the entry, the instruction including one or more operations to be performed on one or more bits in a bit vector register. The method may further include determining as a function of said one or more bits in the bit vector register whether the complex regular expression has been found in the input stream.

A system for handling complex regular expression patterns using local result processor, in one aspect, may include a finite state machine operable to scan an input stream and find a predetermined sub-expression of a regular expression. The system may also include a result table storing the predetermined sub-expression found by said finite state machine and an instruction corresponding to the predetermined sub-expression. The system may further include a bit vector register and a result processor operable to access a result table for an entry associated with the predetermined sub-expression of a regular expression in response to the finite state machine finding the predetermined sub-expression in the input stream. The result processor is further operable to execute an instruction associated with the entry, the instruction including one or more operations to be performed on one or more bits in the bit vector register. The result processor is yet further operable to determine as a function of said one or more bits in the bit vector register whether the complex regular expression has been found in the input stream.

A program storage device readable by a machine, tangibly embodying a program of instructions executable by the machine to perform methods disclosed herein may be also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
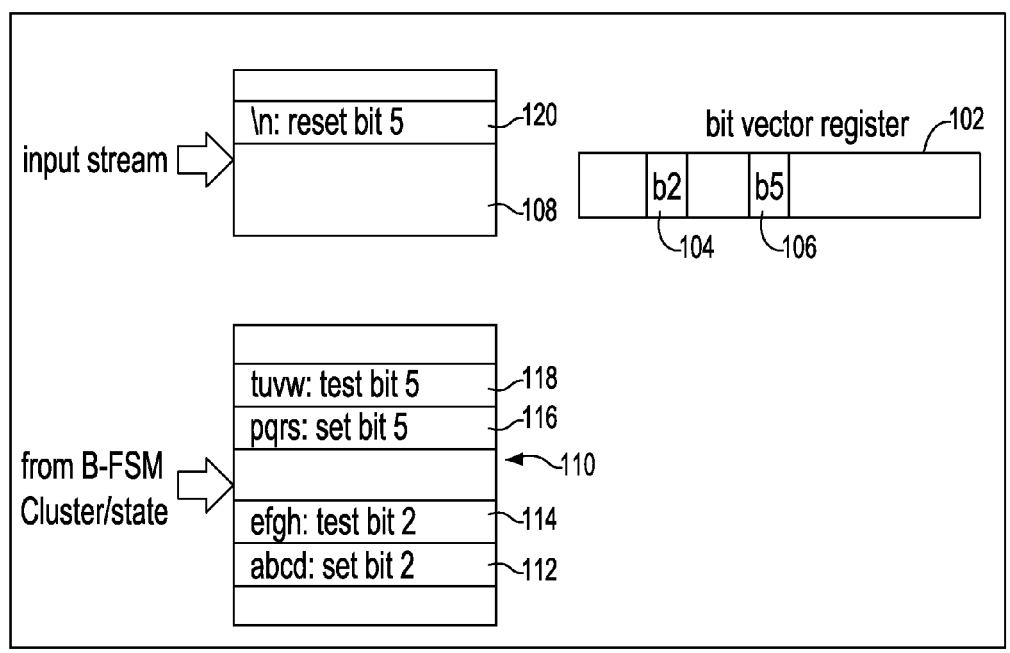
FIG. 1 illustrates the tables and bit vector register used for pattern matching of the present disclosure in one embodiment.

The storage efficiency problem associated with the above-described "state explosion" can be reduced and/or eliminated within a pattern-matching engine of the present disclosure through the local result processor function. In addition to improving the storage efficiency, this function also may keep the total state of the match engine as small as possible, to enable efficient context switching for multi-session support.

A B-FSM is a new type of hardware-based programmable state machine, which is described in the following conference paper: J. van Lunteren, "High-Performance Pattern-Matching for Intrusion Detection," *Proceedings of IEEE INFOCOM '06*, Barcelona, Spain, April 2006, the entire contents of which is incorporated herein by reference.

The B-FSM is programmed by first compiling the patterns that it has to detect into a state-transition-diagram description using algorithms well known to persons skilled in the art. In a next step, the states in the generated state-transition diagram are divided into so called state clusters, which are each assigned a unique cluster identifier. The states are assigned local state vectors by applying a state encoding algorithm in such way that the encoded state vectors are unique within each state cluster. The combination of the cluster identifier and local state vector will then uniquely identify each state in the original state-transition diagram.

For each state cluster, a hash table will be created which will store the state transitions that are defined for each state that is part of the given state cluster. These state transitions will be stored as so called transition rules, which provide a flexible way of specifying a state transition by supporting various input conditions, such as wildcards, case-sensitivity and negated conditions. It also efficiently supports character classes, by allowing a transition rule to test either the current input value or corresponding class information generated by a so called character classifier component which classifies each input value into one of multiple programmable character classes.

For each state, a mask vector is determined by the compiler that will be used by the B-FSM during normal operation to derive a hash index from the local state vector and current input value and find the applicable state transition for the given state and input combination. When the B-FSM 'executes' a state transition, the selected transition rule will provide the cluster or table address, local state vector and mask of the next state to which the B-FSM will branch, which are then used in the next cycle to select a state transition based on the next input value.

The B-FSM will output in each cycle the combination of the current cluster identifier (which is typically made equal to the address of the corresponding hash table) and the local state vector, which, as described above, uniquely defined the original state in the state-transition diagram. Based on this cluster/state combination a lookup is performed on a so called local result table. If the original state corresponds to the detection of a pattern (i.e., if arriving at that given state implies that the input stream would contain an input string matching that pattern), then the lookup on the local result table using the cluster/state combination will provide an identifier corresponding to the detected pattern. The local result table is compressed using the BaRT algorithm (hash function), with the hash index being extracted from the table/cluster vector in combination with the local state vector. The above paper describes this in more detail.

In one embodiment of the present disclosure, a pattern-matching engine includes one or multiple B-FSMs, each containing a local result processor, which is a simple processing engine that can be used to perform postprocessing on the results, e.g., pattern identifiers that have been output by the B-FSM. In the typical case, the local result processor will execute instructions that are associated with selected states, and which will be stored and looked up in the local result table, similar to the pattern identifiers as described above.

In one embodiment of the present disclosure, the local result processor may be extended with a register storing a bit vector. For instance, the local result processor may be implemented with additional hardware register. In another aspect, an existing register that is not used for other purposes may be used for the function of holding the bit vectors. The bit vector size depends on an implementation choice and may typically comprise between 32 and 256 bits.

The bit vector can now be used to test conditions related to the order in which (sub)patterns are detected, and consequently provides a storage-efficient way for handling patterns with different types of overlaps as described before, which will now be discussed in more details.

For the previously described example of the first regular expression, regex1=abcd.*efgh, the B-FSM can now scan the input stream independently for the two regex subexpressions, "abcd" and "efgh". When the first subexpression "abcd" is found in the input stream, an entry in the result table will be accessed by the local result processor for the cluster/state combination provided by the B-FSM, which corresponds to the detected subexpression. This entry will now contain an "instruction" specifying that a particular bit (e.g., allocated by the compiler) within the bit vector register has to be set to one. When the second subexpression "efgh" is detected, the corresponding entry in the result table will contain an "instruction" specifying that the bit position within the bit vector register that corresponds to the first subexpression "abcd", has to be tested. Only if that bit equals one, meaning that the first subexpression had already been found, then the local result processor will forward the identifier of the regular expression, regex1, to the application indicating that a match has been found.

The second regular expression, regex2=pqrs[^\n]*tuvw, can be implemented in a similar fashion with one addition to implement the verification that only characters occur in between the two subexpressions that are allowed according to the regular expression, in this example, these are all characters except for a newline character, "\n". This may be done using an additional table which is indexed by the input character and has a table entry for each relevant input value and/or class. Based on the allocated bits within the bit vector register for the given regular expressions, the compiler will fill this table with information that will trigger a reset of selected bits within the bit vector register when a particular input character occurs that is not "allowed" to occur between two subexpressions of a given regex pattern. In the above example, the table entry corresponding to a newline character, "\n", will contain information that the corresponding bit within the bit vector register will be reset if a newline character occurs at the input. As a result, the bit in the bit vector register will only contain a one if the subpattern "pqrs" has been detected in the input stream and it has not been followed by a newline character, "\n".

FIG. 1 illustrates the tables and bit vector register for the first two examples discussed above. Bit 2 (104) in bit vector register (102) is set to '1' by the local result processor in response to the detection of pattern "abcd" in the input. Otherwise bit 2 (104) remains '0'. Bit 5 (106) in bit vector register (102) is set to '1' by the local result processor in response to detecting pattern "pqrs" in input, not followed by "\n". Otherwise bit 5 (106) remains '0'. Local result table (110) is accessed based on a hash index derived from the cluster/state combination provided by the B-FSM. For the cluster/state combinations corresponding to the detection of the four patterns involved in this example, it contains instructions that operate on the bits in the bit vector register, in this case, set and test instructions. Reset table (108) contains entries for relevant input characters which include reset instructions operating on selected bits in the bit vector register.

There is a special case in which the second subexpression contains one or more characters that are "not allowed" to occur between the subexpressions according to the regular expression (i.e., these characters are not part of the character class). In this case, an additional bit will be used in the bit vector register, because the original bit in the bit vector register would have been reset by the occurrence of these characters before the second subpattern has been detected completely. This will now be illustrated using the following example:

$$regex3=pqrs[\^u]*tuvw$$

Similar to the previous example, one bit will be allocated in the bit vector register, which will be set if the "pqrs" pattern has been detected in the input stream, and will be reset when a "u" occurs in the input stream. Consequently, this bit will only equal one if "pqrs" has been detected and has not been followed by a "u".

Now a second bit will be allocated in the bit vector register, at an adjacent bit position. The original "reset table" entry corresponding to "u", which triggers the reset of the first bit in case of the detection of a "u", is extended with a bit flag that indicates that before a reset, the original value of the first bit has to be copied to the second adjacent bit. As a result, this second bit will only equal one, if the first subpattern "pqrs" has been detected in the input stream, and is followed by exactly one occurrence of the character "u". Note that additional bits could be used in a similar way to represent any number of occurrences of the character "u". Note also that alternative to the described approach, which is often denoted as "one hot" encoding, the number of "U" characters could also be encoded using different styles, e.g., binary. Upon detection of the second subpattern "tuvw", the second bit is tested. If it equals one, then this means that a match for pattern regex3 has been found. Because only one occurrence of "u" has been detected after the detection of the first subpattern "pqrs", this has to be the "u" that is part of the second subpattern "tuvw".

The terms "instruction" and "processor" used herein may include operations and functions, basic logic functions that can be implemented very efficiently in a pipelined fashion, operating outside the critical loop within the B-FSM logic.

Figure 2:
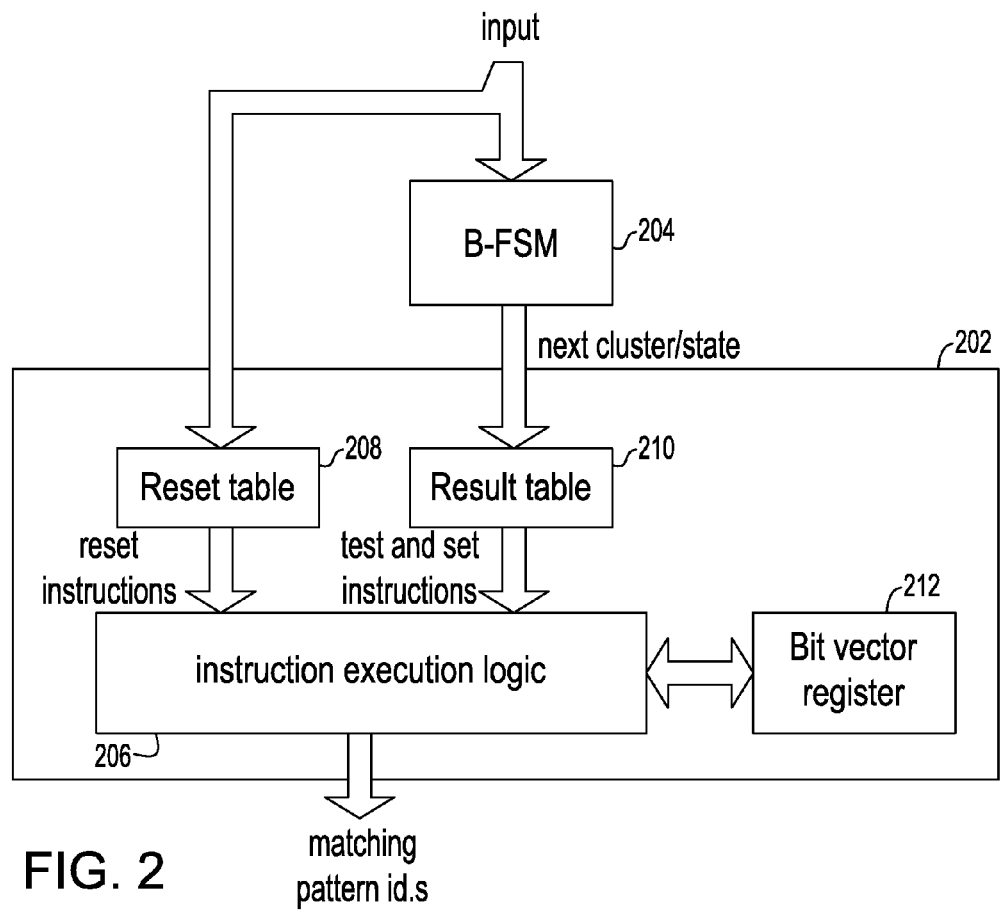
FIG. 2 is a system architectural diagram illustrating components of the present disclosure in one embodiment.

FIG. 2 is a system architectural diagram illustrating components of the present disclosure in one embodiment. A result processor 202 of a B-FSM 204 may include a reset table 208, result table 210, instruction execution logic 206 and a bit vector register 212. B-FSM 204 outputs the current cluster/state to the result table 210. The result table 210 includes one or more cluster/state entries with corresponding instructions. The reset table 208 may include entries which in response to an occurrence of a given input character in the input stream would trigger resetting of selected bits in the bit vector register 212, and include corresponding instructions for resetting of the bit vector register 212. The instruction execution logic 206 executes the instructions found in the result table 210 and/or the reset table 208. The instruction execution logic 206 also determines based on the content of the bit vector register 212 whether matching patterns have been detected and accordingly outputs the matches, for example, matching pattern identifiers.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF, etc.

Computer program code for carrying out operations of the present invention may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
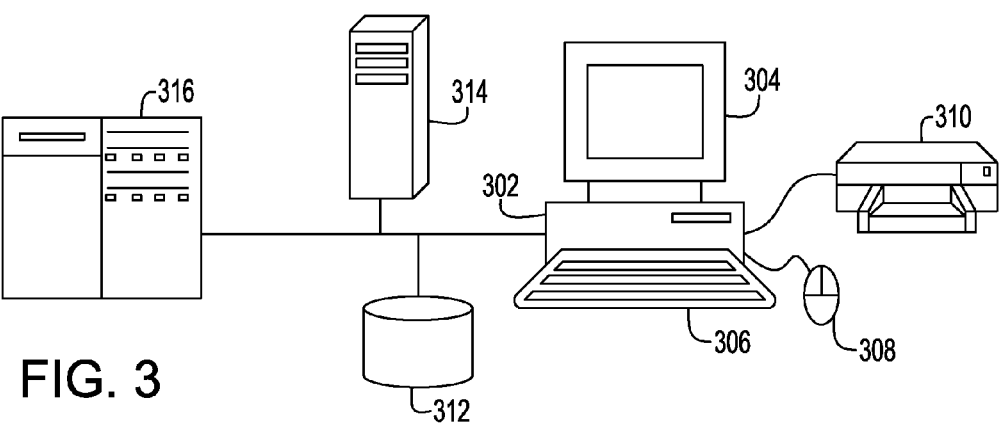
FIG. 3 illustrates an example of a computer system that may be used in carrying out the system and method of the present disclosure in one embodiment.

Referring now to FIG. 3, the systems and methodologies of the present disclosure may be carried out or executed in a computer system that includes a processing unit 302, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 302 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 304 for presenting output displays and providing a display through which the user may input data and interact with the processing system, for instance, in cooperation with input devices such as the keyboard 306 and mouse device 308 or pointing device. The computer processing system may be also connected or coupled to one or more peripheral devices such as the printer 310, scanner (not shown), speaker, and any other devices, directly or via remote connections. The computer processing system may be connected or coupled to one or more other processing systems such as a server 316, other remote computer processing system 314, network storage devices 312, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 302, 314, 318), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A method for handling regular expression patterns, comprising:

scanning by a finite state machine, an input stream;

accessing by a result processor, a result table for an entry associated with a predetermined sub-expression of a regular expression in response to the finite state machine finding the predetermined sub-expression in the input stream;

executing by the result processor an instruction associated with the entry of the result table, the instruction comprising an operation to be performed on one or more bits in a bit vector register, the operation comprising setting a bit or testing the bit in the bit vector register, the bit vector register created to test conditions related to an order in which the sub-expression is detected, the bit vector register operated on based on the instruction by setting a bit position in the bit vector to a value or by testing whether the bit position in the bit vector register is set to the value; and determining as a function of said one or more bits in the bit vector register whether the regular expression has been found in the input stream, wherein responsive to determining as a result of the testing that the bit position in the bit vector register is set to the value, determining that the regular expression with a desired order of the sub-expression has been found, wherein the result processor comprises the result table, an instruction execution logic and the bit vector register.

2. The method of claim 1, further including:

accessing by the result processor, a reset table for an entry corresponding to a character in the input stream and one or more second instructions associated with the entry, said one or more second instructions for performing one or more further operations on said one or more bits in the bit vector register.

3. The method of claim 2, wherein the instruction includes setting said one or more bits in the bit vector register.

4. The method of claim 2, wherein the instruction includes testing said one or more bits in the bit vector register.

5. The method of claim 2, wherein the one or more second instructions include resetting said one or more bits in the bit vector register.

6. The method of claim 2, wherein the one or more second instructions include copying said one or more bits in the bit vector register to another area in the bit vector register.

7. A non-transitory program storage device readable by a machine, tangibly embodying a program of instructions executable by the machine to perform a method of handling regular expression patterns, comprising:

scanning by a finite state machine, an input stream;

accessing by a result processor, a result table for an entry associated with a predetermined sub-expression of a regular expression in response to the finite state machine finding the predetermined sub-expression in the input stream;

executing by the result processor an instruction associated with the entry of the result table, wherein responsive to determining that the instruction specifies to set a bit position allocated for the sub-expression in a bit vector register comprising a plurality of bit positions, the executing the instruction comprises setting the bit position of the bit vector register to a value, and wherein responsive to determining that the instruction specifies to test the bit position, the executing the instruction comprises testing to determine whether the bit position of the bit vector register is set to the value; and wherein responsive to determining as a result of the testing that the bit position in the bit vector register is set to the value, determining that the regular expression with a desired order of the sub-expression has been found, wherein the result processor comprises the result table, an instruction execution logic and the bit vector register.

8. The program storage device of claim 7, further including:

accessing by the result processor, a reset table for an entry corresponding to a character in the input stream and one or more second instructions associated with the entry, said one or more second instructions for performing one or more further operations on one or more bits in the bit vector register.

9. The program storage device of claim 8, wherein the instruction includes setting said one or more bits in the bit vector register.

10. The program storage device of claim 8, wherein the instruction includes testing said one or more bits in the bit vector register.

11. The program storage device of claim 8, wherein the one or more second instructions include resetting said one or more bits in the bit vector register.

12. The program storage device of claim 8, wherein the one or more second instructions include copying said one or more bits in the bit vector register to another area in the bit vector register.

13. A system for handling regular expression patterns, comprising:

a finite state machine operable to scan an input stream and find a predetermined sub-expression of a regular expression;

a result table storing the predetermined sub-expression found by said finite state machine and an instruction corresponding to the predetermined sub-expression;

a bit vector register, the bit vector register comprising a plurality of bit positions, a bit position in the plurality of bit positions allocated by a compiler to correspond to the sub-expression;

a result processor operable to access a result table for an entry associated with the predetermined sub-expression of a regular expression in response to the finite state machine finding the predetermined sub-expression in the input stream, the result processor further operable to execute an instruction associated with the entry of the result table, the instruction comprising an operation to be performed on one or more bits in the bit vector register, the operation comprising setting a bit or testing the bit in the bit vector register, the result processor further operable to determine as a function of said one or more bits in the bit vector register whether the regular expression has been found in the input stream, the bit vector register operated on based on the instruction by setting the bit position in the bit vector to a value or by testing whether the bit position in the bit vector register is set to the value, wherein responsive to determining as a result of the testing that the bit position in the bit vector register is set to the value, the result processor determines that the regular expression with a desired order of the sub-expression has been found, wherein the result processor comprises the result table, an instruction execution logic and the bit vector register.

14. The system of claim 13, further including:

a reset table including one or more entries corresponding to a character and one or more second instructions associated with the entry, wherein the result processor is further operable to access the reset table and execute said one or more second instructions as a function of finding the character in the input stream.

15. The system of claim 14, wherein the instruction includes setting said one or more bits in the bit vector register.

16. The system of claim 14, wherein the instruction includes testing said one or more bits in the bit vector register.

17. The system of claim 14, wherein the one or more second instructions include resetting said one or more bits in the bit vector register.

18. The system of claim 14, wherein the one or more second instructions include copying said one or more bits in the bit vector register to another area in the bit vector register.

19. The method of claim 1, the testing the bit comprises determining whether the bit is set or not, and based on whether the bit is set, determining whether the regular expression has been found in the input stream.

* * * * *